US005487151A

United States Patent [19]

Kikuchi et al.

[11] Patent Number: 5,487,151

[45] Date of Patent: Jan. 23, 1996

[54] TRANSMISSION ERROR DETECTION SYSTEM FOR USE IN A DISASTER PREVENTION MONITORING SYSTEM

[75] Inventors: Masamichi Kikuchi, Ayase; Akio Adachi, Machida, both of Japan

[73] Assignee: Hochiki Kabushiki Kaisha, Tokyo, Japan

[21] Appl. No.: 355,827

[22] Filed: Dec. 14, 1994

Related U.S. Application Data

[63] Continuation of Ser. No. 859,104, Mar. 27, 1992, abandoned.

[30] Foreign Application Priority Data

Apr. 15, 1991 [JP] Japan .................................... 3-082338
Apr. 15, 1991 [JP] Japan .................................... 3-082340

[51] Int. Cl.[6] ...................................................... G06F 11/00

[52] U.S. Cl. ................................ 395/185.02; 395/184.01

[58] Field of Search .............................. 395/575, 182.02, 395/184.01, 185.02; 371/53, 20.1, 48

[56] References Cited

U.S. PATENT DOCUMENTS 3,806,872 4/1974 Odom .................................. 340/147 R
4,357,605 11/1982 Clements ........................... 340/825.14
4,894,827 1/1990 Ramsay et al. .......................... 371/8.2
4,901,316 2/1990 Igarashi et al. ........................ 371/37.1
4,947,396 8/1990 Shin et al. ............................. 371/40.1
4,996,518 2/1991 Takahashi et al. ....................... 340/518
5,065,150 11/1991 Machida et al. ................... 340/825.06
5,101,199 3/1992 Suzuki .............................. 340/825.08
5,227,763 7/1993 Kikuchi .................................. 340/518
5,243,561 9/1993 Yamauchi .......................... 365/189.12
5,251,214 10/1993 Mertens et al. ........................... 370/92
5,252,967 10/1993 Brennan ............................ 340/872.02
5,278,977 1/1994 Spencer et al. ......................... 395/575

*Primary Examiner*—Robert W. Beausoliel, Jr.
*Assistant Examiner*—Joseph E. Palys
*Attorney, Agent, or Firm*—Max Fogiel

[57] ABSTRACT

A transmission data synchronization system in a disaster prevention monitoring system comprises the steps of: connecting a plurality of terminal units to first and second transmission lines led out from a receiver; sending out access data in the form of a voltage from the receiver through the first transmission line; and sending back response data by a terminal unit specified in the access data in the form of an electric current through the second transmission line during a response time period. The response data sent back by a terminal unit which has responded to the access data sent out by the receiver is formed of terminal state data and checksum data produced by adding the terminal state data to the self-address data. The receiver adds the address data to the terminal state data, and determines that a transmission error has occurred when the data determined from the addition does not match the checksum data. Each of the terminal units transfers the response data during the response time period when each terminal unit is specified in the access data. When the terminal unit is not specified in the access data, the receiving of data through the the first transmission line is inhibited during the response time period. Thus, high reliability and high-speed transmission of data are realized in the system for detecting errors in data transmission between the receiver and the terminal units in the disaster prevention monitoring system based on the polling system.

3 Claims, 13 Drawing Sheets

MAIN ROUTINE OF RECEIVER

POLLING PROESSING ROUTINE

MAIN ROUTINE OF TERMINAL UNIT

ERROR CHECK ROUTINE

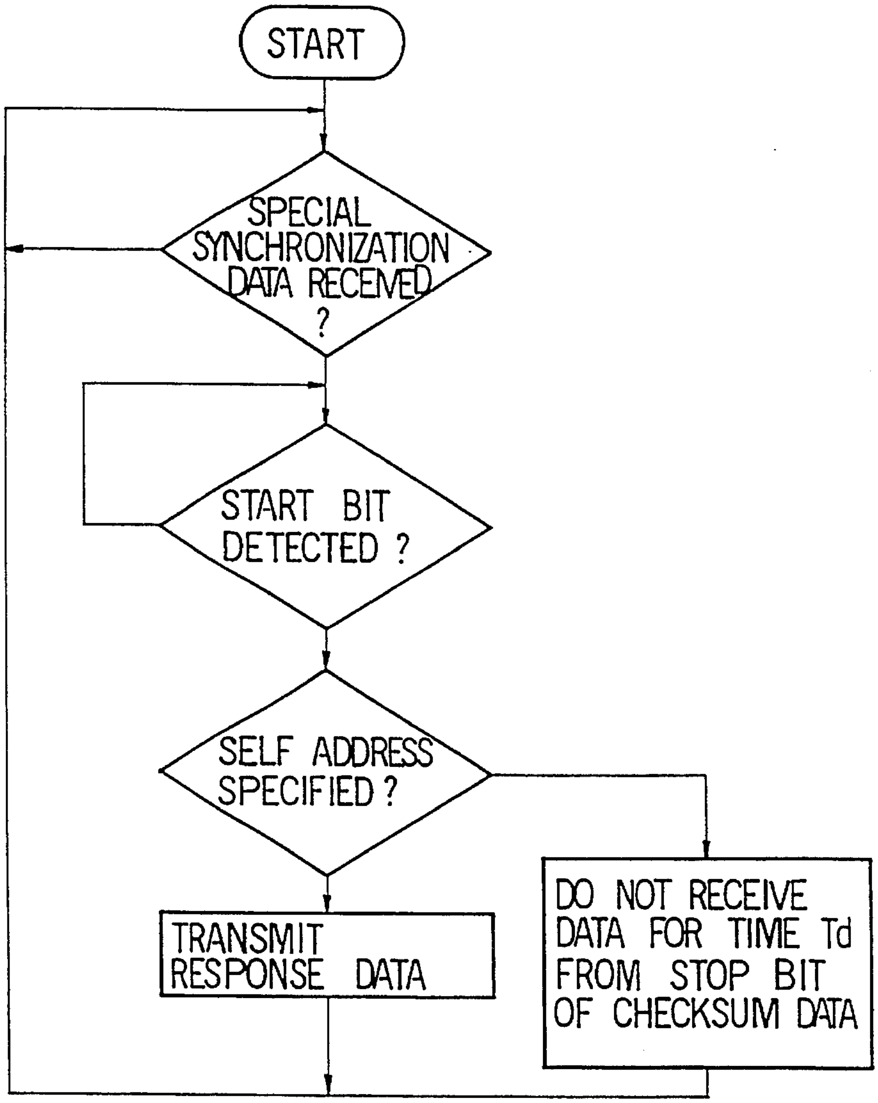
Fig. 10 PRIOR ART
Fig. 11(A)
PRIOR ART
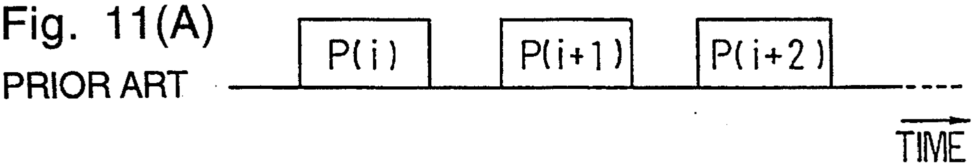
Fig. 11(B)
PRIOR ART
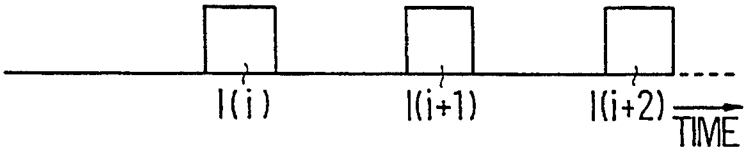

TRANSMISSION ERROR DETECTION SYSTEM FOR USE IN A DISASTER PREVENTION MONITORING SYSTEM

The present application is a continuation of the parent application Ser. No. 859,104, filed Mar. 27, 1992, now abandoned.

BACKGROUND OF THE INVENTION

1. Field of the invention

The present invention relates to a system for data transmission between receivers and terminal units in a disaster prevention monitoring system. More particularly, the present invention relates to a transmission error detection system for detecting errors during data transmission and to a transmission data synchronous system for eliminating errors during data transmission.

2. Description of the Related Art

Hitherto, in a disaster prevention monitoring system according to the prior art, such as a fire monitoring system, transmission lines are led out to monitoring areas from a receiver disposed in a central monitor station or the like. terminal units, such as fire sensors, gas sensors or repeaters, are connected to these transmission lines. The receiver calls in turn these terminal units by using what is called a "polling" system and receives response data from each of the terminal units. Thus, monitor areas are centrally monitored.

An example of data transmission in a conventional polling system will now be explained with reference to Fig. 10. An address specific to each of the terminal units is set beforehand. As shown in FIG. 11(A), access data P(i), P(i+1), P(i+2) . . . are sent out from a receiver to terminal units at a predetermined cycle. In contrast, as shown in FIG. 11(B), the terminal units specified by each access data send back response data I(i), I(i+1), I(i+2) . . . indicating the respective situations of the monitor areas, and the receiver receives these response data. The receiver then analyzes these response data and determines whether an abnormality has occurred in the monitor areas.

Referring to the timing charts shown in FIGS. 12(A) and 12(B), an example of data transmission in the conventional polling system will now be explained. The receiver sends out access data consisting of command data, address data and checksum data, each of which is one byte long, at times t1 and t2, as shown in FIG. 12(A). In response to this, an i-th terminal unit specified in the address data sends back response data consisting of terminal state data indicating the monitor results and checksum data at times t3 and t4, as shown in FIG. 12(B). The same process is performed in the (i+1)-th terminal unit. As the receiver changes in turn the contents of the address data and sends back access data in the same manner as described above, response data from other terminal units can be obtained in turn.

The checksum data of the access data, shown in FIG. 12(A), sent out from the receiver is added so that terminal units can detect an error. The checksum is the sum of the command data and the address data (modulo 256). In contrast, the checksum data of the response data of each terminal unit, shown in FIG. 12(B), is added so that the receiver can detect an error in the response data. The checksum data is the terminal state data modulo 256.

In data transmissions other than that described above in the conventional polling system, a specific address is set in each of the terminal units beforehand in the same manner as described above. The receiver sends out access data consisting of command data, address data and checksum data, each of which is one byte long, at times t1 and t2, as shown in portion (C) of FIG. 12(B). Responding to this, an i-th terminal unit specified in the address data sends back response data consisting of terminal state data indicating the monitor results, self-address data and checksum data at times t3 and t4, as shown in portion (D) FIG. 12(B). The same process is performed in the (i+1)-th terminal unit. As the receiver changes in turn the contents of the address data and sends back access data in the same manner as described above, monitor data from other terminal units can be obtained in turn.

The checksum data, shown in portion (C) FIG. 12(B), sent out from the receiver is, the sum of the command data and the address data (modulo 256). The checksum data of the response data of each of the terminal units, shown in portion (D) FIG. 12(B), is the sum of the terminal state data and the self-address data (modulo 256).

In these transmission systems, transmissions tare place at timings shown in the figures while whether there are transmission errors is being checked by analyzing the checksum data in the transmission data received by the receiver and each terminal unit.

Incidentally, as described above, in the conventional transmission system, access data sent out from the receiver at each cycle has a command field, an address field and a checksum field. These fields are delimited by start bits s1, s2, and s3, and stop bits e1, e2, and e3, as shown in FIG. 13. A one-byte command data used to instruct terminal units to send back response data is set in the command field. address data used to specify a terminal unit is set in the address field. A checksum data used to detect transmission errors is set in the checksum field.

Each of the field data, as shown in FIG. 14, is formed of: a start bit, having a logic value "L", indicated by a code S; a one-byte field data indicated by codes b0 to b7; a parity bit PR used to detect transmission errors; and a stop bit, having a logic value "H", indicated by a code E. In this case, code b0 is the least significant bit, and b7 is the most significant bit. When data is transmitted from the receiver to terminal units, it is transferred in synchronization with a predetermined transfer rate beginning chronologically with a start bit.

The terminal units are permitted to synchronize with the receiver as a result of the terminal units detecting the start and stop bits indicating the beginning and end of each field. The terminal unit specified in each field data sends back response data to the receiver.

As shown in FIG. 15, there is a case in another example of the prior art, in which synchronization codes formed of predetermined-bit data may be appended before the command field in order to reduce transmission errors by making the separation of each access data clear. With such a transmission system, the problem of the data transmission becoming out of synchronization due to noise in the transmission line or the like can be reduced more than in a case in which the synchronization is provided only on the basis of the start and stop bits. As a result, the reliability of data transmission can be increased.

However, the transmission error detection system of such a conventional disaster prevention monitoring system has problems described below.

First, in the data transmission system shown in FIGS. 12(A) and 12(B), response data from terminal units is formed of terminal state data and the checksum data produced from the terminal state data, and data indicating self-address data is not sent back. Consequently, for example the other terminal responds in error by a transmission noise and when a plurality of terminal units respond simultaneously, the receiver cannot confirm which terminal unit has sent back the response data. Therefore, a problem arises in that the reliability of the system is decreased.

Next, in the data transmission system shown portions (C) and (D) of in FIG. 12(B), since response data from terminal units is formed of terminal state data, self-address data and checksum data and therefore has much data, a problem arises in that polling the terminal units is slow. In particular, in a large-scale disaster prevention monitoring system having a great number of terminal units, the slow polling is a hindrance to high-speed disaster prevention monitoring.

Furthermore, since a predetermined start bit and stop bit is appended before and after the command field in the transmission system explained with reference to FIGS. 13 and 14, the following problem occurs. When noise occurs in a transmission line connected from the receiver to terminal units, the receiver incorrectly recognizes this noise as start or stop bits. For this reason, positions at which each field data in the access data is sampled are shifted. As a result, a problem arises in that a terminal unit different from that specified by the receiver responds, or malfunctions occur because synchronization cannot be established between the receiver and the terminal units.

In addition, the transmission system shown in FIG. 15 has a problem in that since a large amount of data must be transmitted because a predetermined-bit synchronization code is appended before the command data, the transmission efficiency is decreased, and therefore it is difficult to realize high-speed polling.

SUMMARY OF THE INVENTION

The present invention has been accomplished in light of the above-mentioned problems of the prior art.

An object of the present invention is to provide an error detection system of a disaster prevention monitoring system, which is capable of achieving both high reliability and a high speed of data transmission.

Another object of the present invention is to provide a transmitting data synchronization system of a disaster prevention monitoring system, which is capable of eliminating the influences of noise which occurs during transmission and of achieving high-speed polling.

To this end, according to one aspect of the present invention, there is provided a transmission error detection system for detecting errors in data transmission between a receiver and terminal units in a disaster prevention monitoring system, wherein response data sent back by the terminal unit which responds to the access data sent out by the receiver is formed of terminal state data and checksum data which is formed by adding the terminal state data to the self-address data of the terminal unit, and the receiver adds the self-address data to the terminal state data and determines that, when the data determined by this addition does not match the checksum data, a transmission error has occurred.

According to such a transmission error detection system, if there is no transmission error, the checksum data formed by adding the terminal state data in the response data sent back from the terminal unit to the self-address data will match the data determined by the receiver by adding the address data to the terminal state-data. Thus, transmission errors can be detected by checking the match.

According to the present invention, it can be reliably detected in which terminal unit a transmission error has occurred. there is an advantage in that high-speed polling is made possible because the length of the response data is short even if data on self-address is contained therein.

According to another aspect of the present invention, there is provided a transmitting data synchronization system of a disaster prevention monitoring system in which a plurality of terminal units are connected to first and second transmission lines led out from a receiver; access data is sent out in the form of a voltage through the first transmission line led out from the receiver; and the terminal unit specified by the access data sends back response data in the form of an electric current through the second transmission line during a response time period. Each of the terminal units, when specified by the access data, transfers response data during the response time period, and the reception of data from the first transmission line is inhibited during the response time period when not specified in the access data.

According to such a transmitting data synchronization system of the disaster prevention monitoring system, the terminal unit specified by the access data sent out from the receiver sends back response data, and the other terminal units which have not been specified are inhibited from receiving data from the receiver during a response time period until the next access data is sent out. As a result, the terminal units are not susceptible to influences from noise or the like during the response time period in which the receiver does not send out access data, and thus malfunctions due to noise or the like can be prevented.

In this system, it is only that data is not received during the response time period, and synchronization is not established by using special synchronous data. Therefore, data transmission is not delayed, and high-speed polling can be realized.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 10 is a flowchart which illustrates the responding operation of terminal units;

FIG. 11(*a–b*) is a timing chart which illustrates a conventional polling operation;

DESCRIPTION OF THE PREFERRED EMBODIMENT

An embodiment of the present invention will be explained below with reference to the accompanying drawings.

Figure 1:
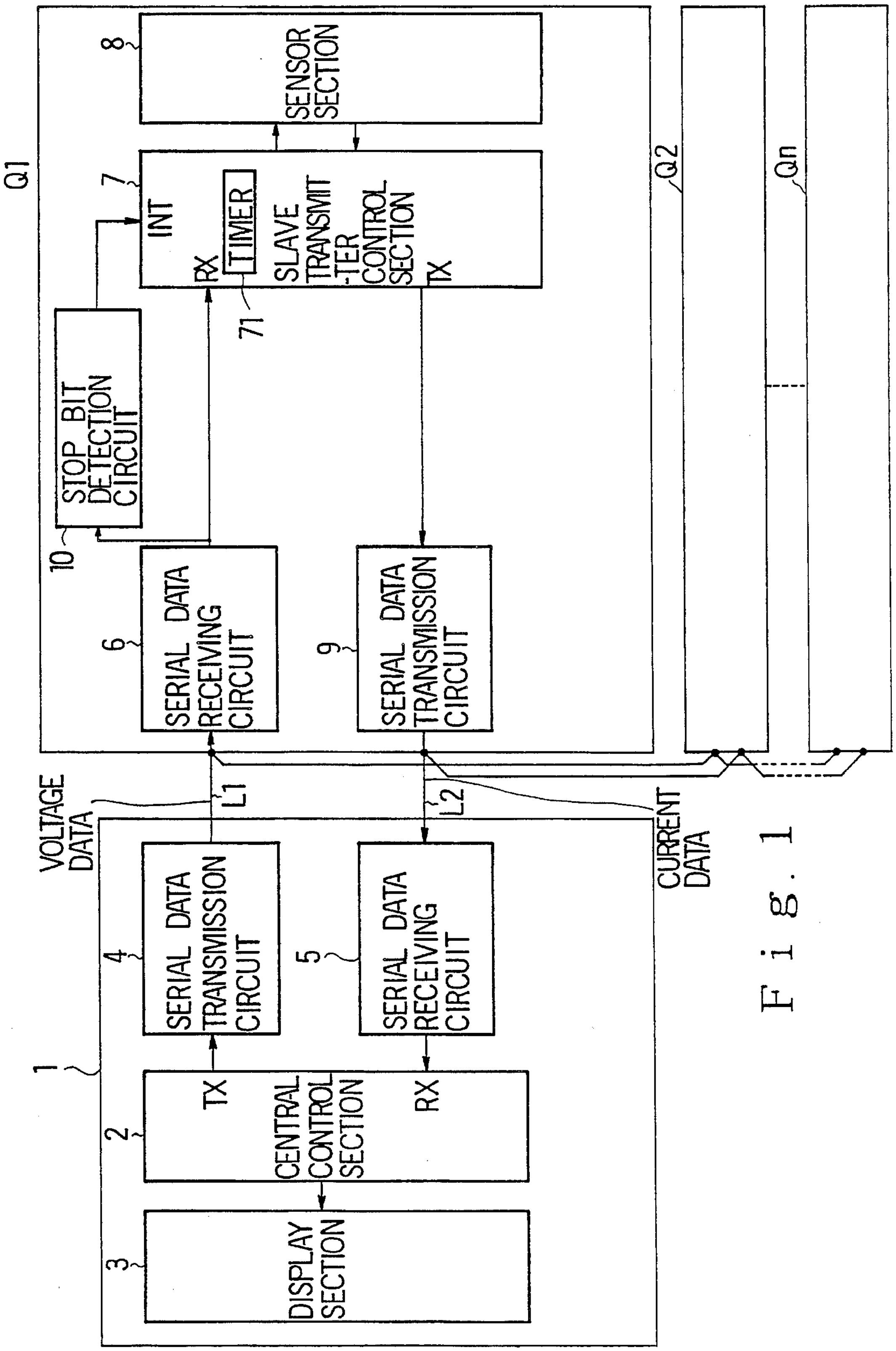
FIG. 1 is a block diagram which illustrates an embodiment of a disaster prevention monitoring system embodying the present invention.

First, the system configuration of a disaster prevention monitoring system of this embodiment will be explained with reference to FIG. 1. In FIG. 1, a receiver 1 disposed in a central monitor station or the like is connected to a plurality of terminal units Q1 to Qn disposed in monitor areas through transmission lines L1 and L2. When the receiver 1 sends out in turn access data in the form of an voltage through the transmission line L1, a terminal unit corresponding to the access data sends back response data through the transmission line L2 in the form of an electric current. What is called a "polling" system is adopted in this embodiment.

The receiver 1 comprises a central control section 2 which contains a microprocessor for forming access data, analyzing response data, and performing other functions, a display section 3 for displaying monitored state or the like, a serial data transmission circuit 4 for serially transmitting access data, and a serial data receiving circuit 5 for receiving response data from terminal units.

The central control section 2 supplies access data in a predetermined format to the serial data transmission circuit 4 at a predetermined cycle. The serial data transmission circuit 4 converts the access data to chronological data and sends it out to the transmission line L1.

The response data from a terminal unit specified in the access data is received by the serial data receiving circuit 5 through the transmission line L2. The serial data receiving circuit 5 further converts the response data from current form to voltage form, converts it from serial form to parallel form, and then supplies it to the central control section 2. Then, the central control section 2 checks the presence of abnormalities in the monitor areas by analyzing the response data or detects the presence of transmission errors which will be described later.

Using a terminal unit Q1 as a typical example, the uses of terminal units will now be explained. It comprises a serial data receiving circuit 6 for receiving access data transferred from the transmission line L1, a slave transmitter control section 7 which contains a microprocessor, a sensor section 8 having sensing functions unique to a terminal unit, for example, sensing fire or gas, a serial data transmission circuit 9 for sending back response data in the form of electric-current serial data, a stop-bit detection circuit 10 for establishing synchronization with the access data transmitted from the receiver 1 through the transmission line L1, and a timer means 71, disposed inside the slave transmitter control section 7, for controlling timings at which the stop-bit detection circuit 10 causes an interruption to the slave transmitter control section 7.

When the serial data receiving circuit 6 receives chronological access data, only the serial data portion which is superimposed to a power supply for a terminal unit is supplied to the slave transmitter control section 7. When the slave transmitter control section 7 determines that its self-address has been specified by the access data, it supplies response data, formed of the terminal state data detected by the sensor section 8 and the checksum data produced by adding the terminal state data to the self-address data, to the serial data transmission circuit 9. The serial data transmission circuit 9 sends out the response data in the form of a chronological electric-current data to the transmission line L2, with the result that the response data is transmitted to the serial data receiving circuit 5 of the receiver 1.

Figure 13:
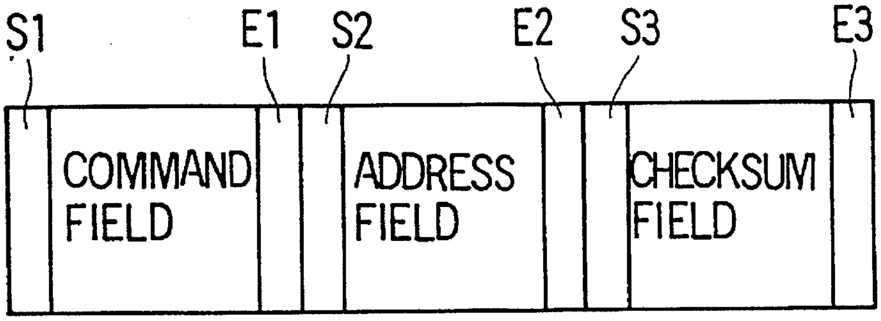
Fig. 13 PRIOR ART
FIG. 13 is a view which illustrates the structure of conventional access data.

When the stop-bit detection circuit 10 detects a stop bit appended after the checksum data in the access data, shown in FIG. 13, it interrupts the slave transmitter control section 7, with the result that synchronization is established at the time the stop bit is detected. In response to this interruption, the slave transmitter control section 7 performs processes which are not affected by noise, unique to the present invention, and which will be described later.

The other terminal units Q2 to Qn have the same components as the terminal unit Q1. The sensor section of each of the terminal units has a sensing function unique to each terminal unit. The terminal unit specified in the access data responds by sending back response data.

Figure 7:
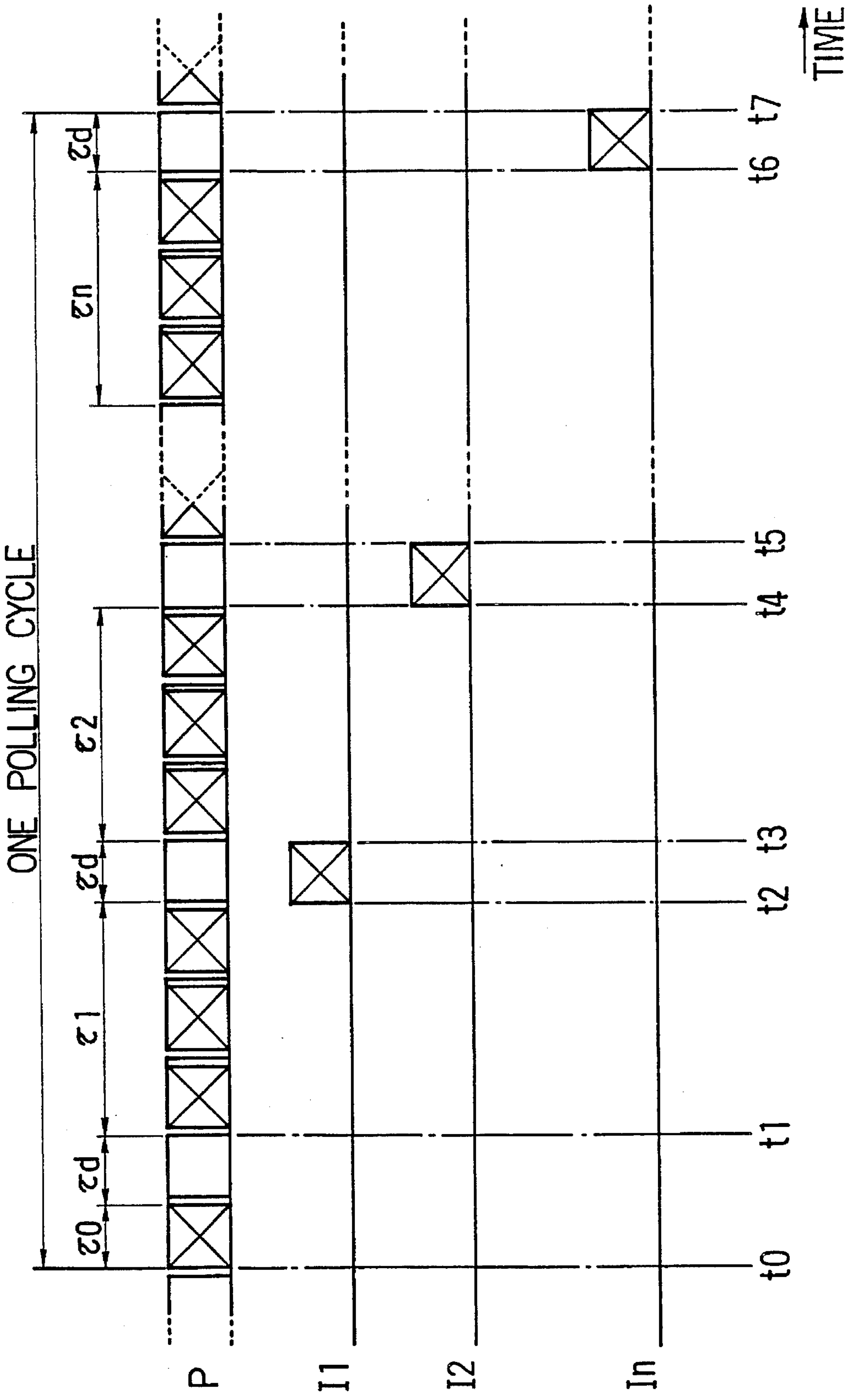
FIG. 7 is a timing chart which illustrates the polling operation of the receiver of the embodiment.

Accordingly, when the terminal unit specified in the address data in the access data, shown in FIG. 7, confirms its self-address, it sends back the above-mentioned response data. If, for example, the first terminal unit Q1 is specified in the access data during a time period t 1, the first terminal unit Q1 sends back response data I1 between times t2 to t3 before the next access data is transferred thereto. If the second terminal unit Q2 is specified in the access data during a time period t 2, in a manner similar to that of the first terminal unit Q1, the second terminal unit Q2 sends back response data I2 between times t4 and t5. as regards the rest of the terminal units, in the same manner as described above, only the terminal unit specified sends back response data.

Figure 12A:
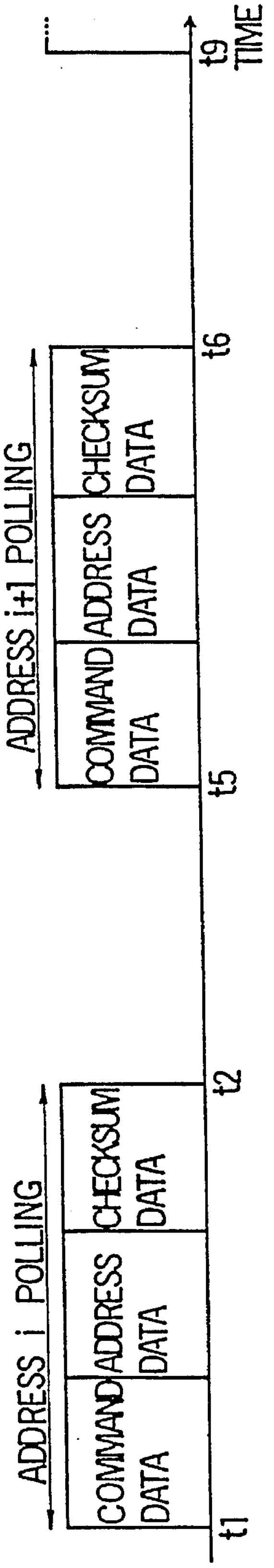
Fig. 12(A) PRIOR ART
FIG. 12(A) and 12(B) is a view which illustrates a conventional transmission system.
Figure 14:
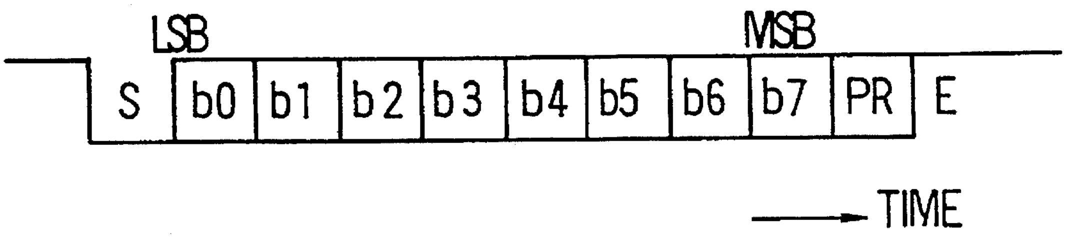
Fig. 14 PRIOR ART
FIG. 14 is a view which illustrates the structure of the conventional access data in more detail.
Figure 15:
Fig. 15 PRIOR ART
FIG. 15 is a view which illustrates another structure of the conventional access data.

Regarding the format of the access data sent out at each cycle from the receiver 1, the access data is formed of a one-byte command data, a one-byte address data and a one-byte checksum data in the same manner as that shown in FIGS. 12(A), 13 and 14. A parity bit used to detect transmission errors and a start bit and a stop bit used to delimit the data are provided in each data field. Command data becomes monitor command data formed of predetermined binary codes when, for example, a request is presented to each terminal unit that response data on disaster prevention monitoring be sent back. The address data at each cycle varies and is binary coded data which specifies an address specific to each terminal unit. The checksum data is the sum of the command data and the address data (modulo 256). The access data is generated at each cycle by the central control section 2. The access data is converted by the serial data transmission circuit 4 into chronological data and sent out to the transmission line L1. Thus, as shown in FIG. 7, the receiver 1 sends out access data P to terminal units Q1 to Qn while the specified address is changed at predetermined cycles t 1, t 2, t 3o.

Figure 12B:
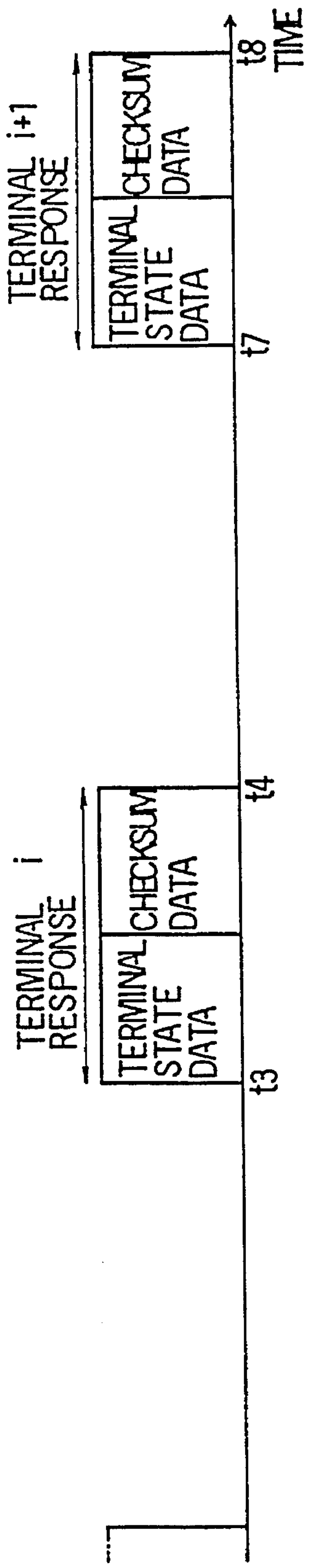
Fig. 12(B) PRIOR ART
Figure 12C:
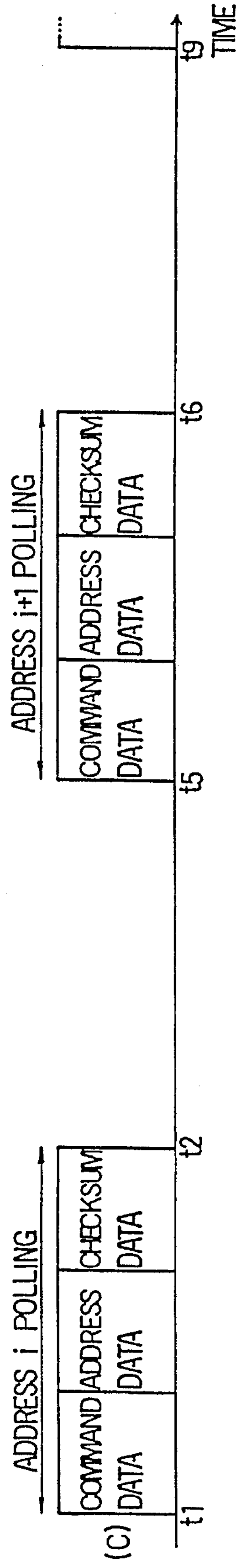
Fig. 12(C) PRIOR ART
Figure 12D:
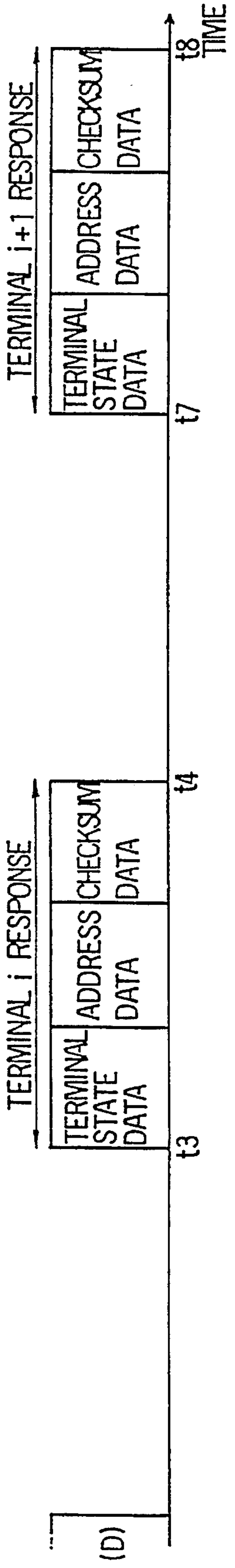
Fig. 12(D) PRIOR ART

Regarding the format of the response data sent from the terminal units, the response data is formed of a one-byte terminal state data and a one-byte checksum data in the same manner as that shown in FIG. 12(B). The terminal unit specified in the address data in the access data sends back the response data. The checksum data for the response data is produced by each terminal unit adding the terminal state data to the self-address data.

In this embodiment, a special synchronization code is sent out at a time period t 0 before polling is started beginning with the first terminal unit Q1, as indicated by the access data P in FIG. 7. The special synchronization code is always transferred in a state in which it is placed in the beginning of the data each time a polling operation is started again beginning with the first terminal unit Q1 after the polling for all the terminal units Q1 to Qn has been completed. The special synchronization code is for checking if terminal units used in the disaster prevention monitoring system are genuine units. When a genuine terminal unit receives the special synchronization code, an illumination indicator provided at one end of the terminal unit is illuminated, indicating that it is a genuine unit.

During a time period in which respective terminal units are sending back the respond data through the transmission line L2 (hereinafter referred to as a response time period), one of the transmission lines, L1, is maintained at level "H" and then is changed to level "L" by the first start bit of the next access data. The terminal units recognize the beginning of the access data by detecting times t1, t3, t5, t7 . . . when the level is inverted from "H" to "L".

Figure 8:
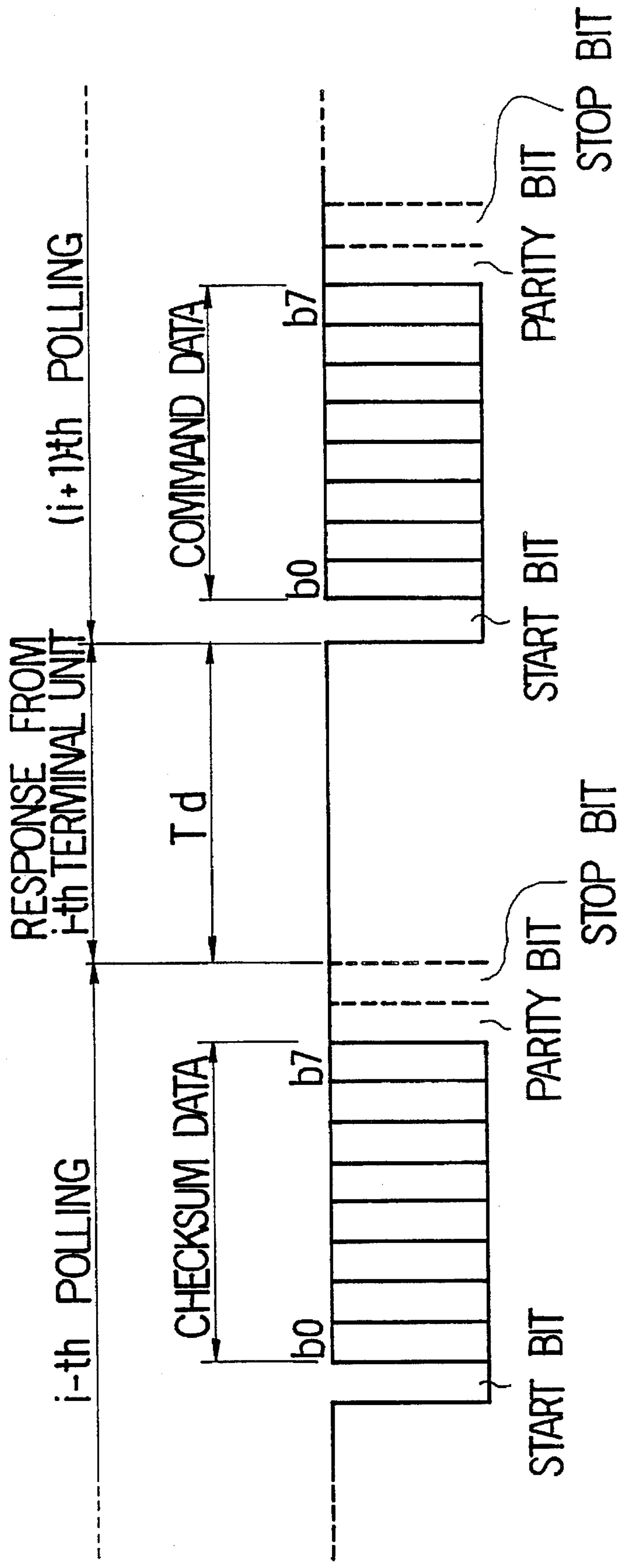
FIG. 8 is a timing chart which illustrates response data in access data.

The functions of the stop-bit detection circuit 10 will now be explained in detail, with reference to FIG. 8. FIG. 8 shows timings at which checksum data in the access data for an i-th terminal unit Qi, command data in the access data for the next (i+1)-th terminal unit Qi+1, and timings at which the i-th terminal unit Qi sends back response data Ii to the receiver 1.

As shown in this figure, only the i-th terminal unit Qi sends back response data during a response time period. On the other hand, the other terminal units, if they judge that they are not specified, cause an interruption to the slave transmitter control section 7 to occur at the same time the stop bit appended after the checksum data is detected. The slave transmitter control sections 7 of the terminal units which have not been specified stop receiving data through the transmission line L1 for a time equal to the response time and cause the transmission line L2 to be placed in a high impedance state. The setting of a period Td during which signals are not received, which period corresponding to the response time, is realized by activating the timer means 71, in which a time setting program (program timer) contained in the slave transmitter control section 7 beforehand as firmware, starting at the interruption time.

Since the period Td, during which data from the receiver 1 is forcibly not received, is provided as described above, even if noise is superimposed in the transmission line L1 while the terminal unit specified in the access data is sending back response data, terminal units are not affected, thus preventing malfunctions thereof.

Next, the transmission error detection operation according to this embodiment will be explained with reference to the flowcharts in FIGS. 2 to 6.

First, an explanation will be given about a case in which an operator instructs the receiver 1 to perform disaster prevention monitoring, and the central control section 2 controls in the disaster prevention monitoring mode.

Figure 3:
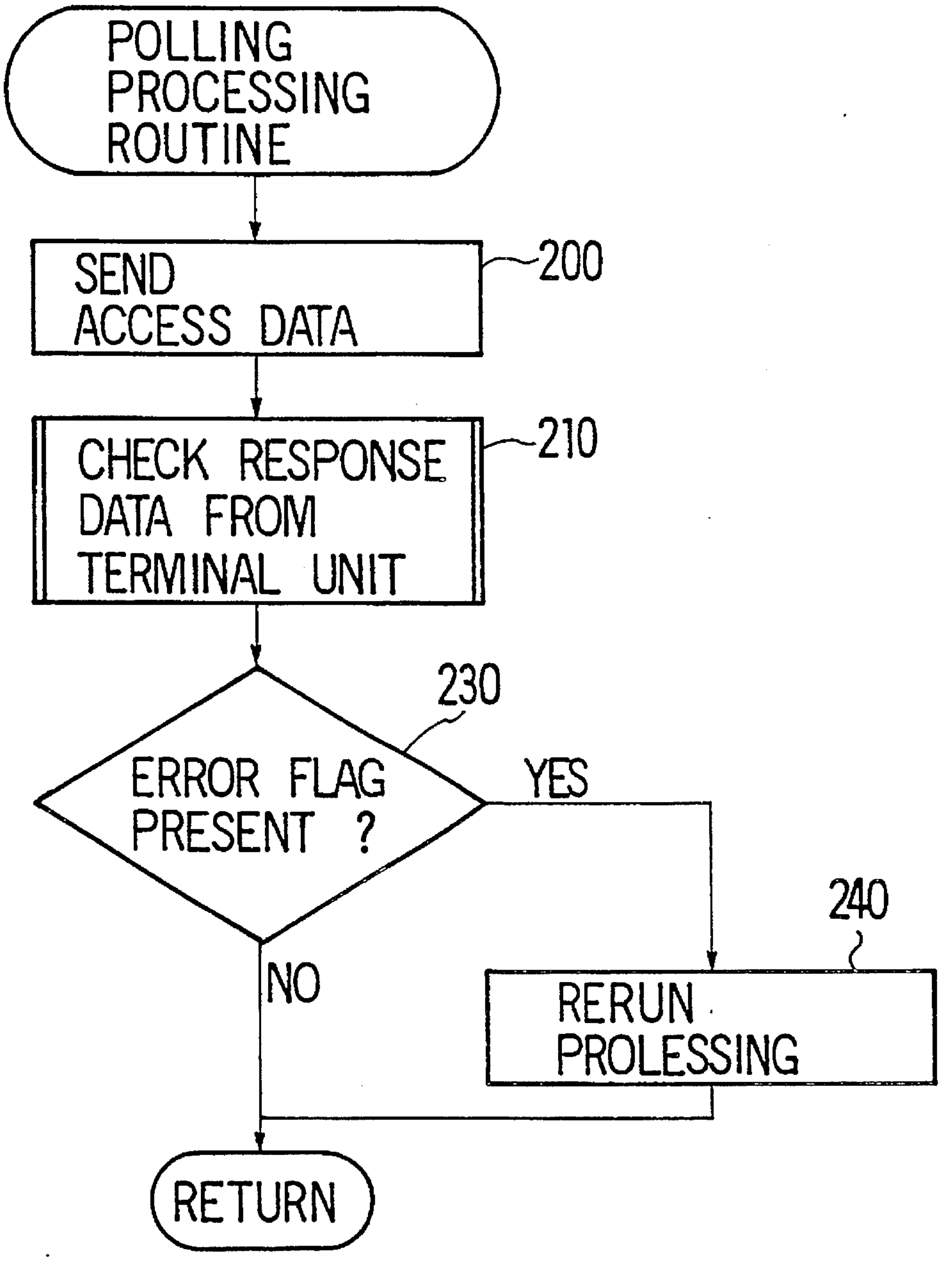
FIG. 3 is a flowchart which illustrates the polling operation of the receiver of the embodiment.

In step 100, the central control section 2 of the receiver 1 sets the address of a terminal unit to be specified first in an address counter. Next, in step 110, an operation for polling the terminal unit corresponding to the address set in the address counter is performed. In this polling operation, as shown in FIG. 3, in step 200, the receiver 1 sends out access data formed of command data, address data which is set in the address counter, and checksum data over the transmission line L2.

Figure 4:
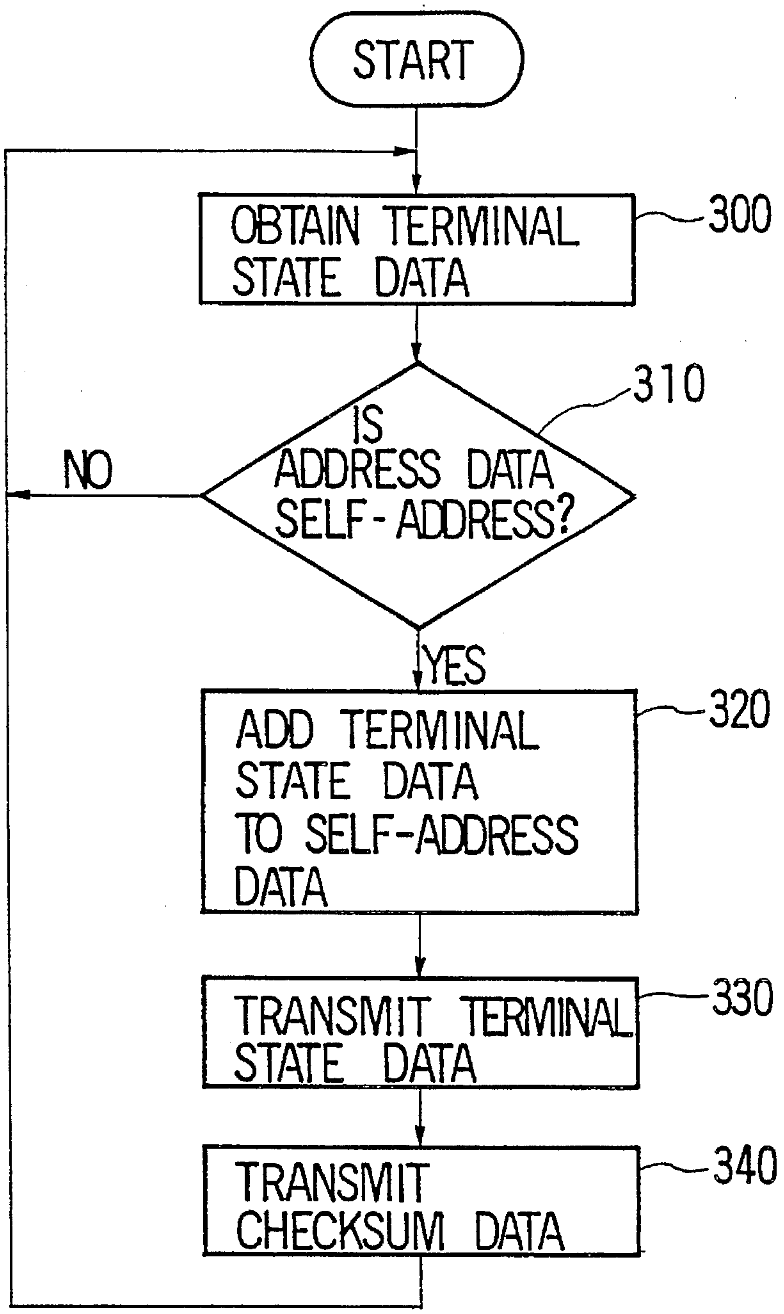
FIG. 4 is a flowchart which illustrates the responding operation off the receiver of the embodiment.

On the other hand, each of the terminal units during the polling operation is performing the operation shown in FIG. 4. Thus, the receiver 1 receives response data from a terminal unit which has responded to the access data. Concerning the operation, shown in FIG. 4, of each of the terminal units, first in step 300, the slave transmitter control section 7 receives terminal state data indicating the state of the monitor area, detected by the sensor section 8. In step 310, the terminal unit waits for the address data in the access data to match its self address. When the address data in the access data matches the self address, the slave transmitter control section 7 adds the terminal state data to the self-address data in step 320, and forms checksum data. Next, in steps 330 and 340, the serial data transmission circuit 9 sends out the response data, the terminal state data, and the checksum data in this order to the transmission line L2.

Referring back to FIG. 3, in step 210, when the response data sent back in response to the access data in this manner is received, a check is made to determine whether there are errors in the response data.

Figure 5:
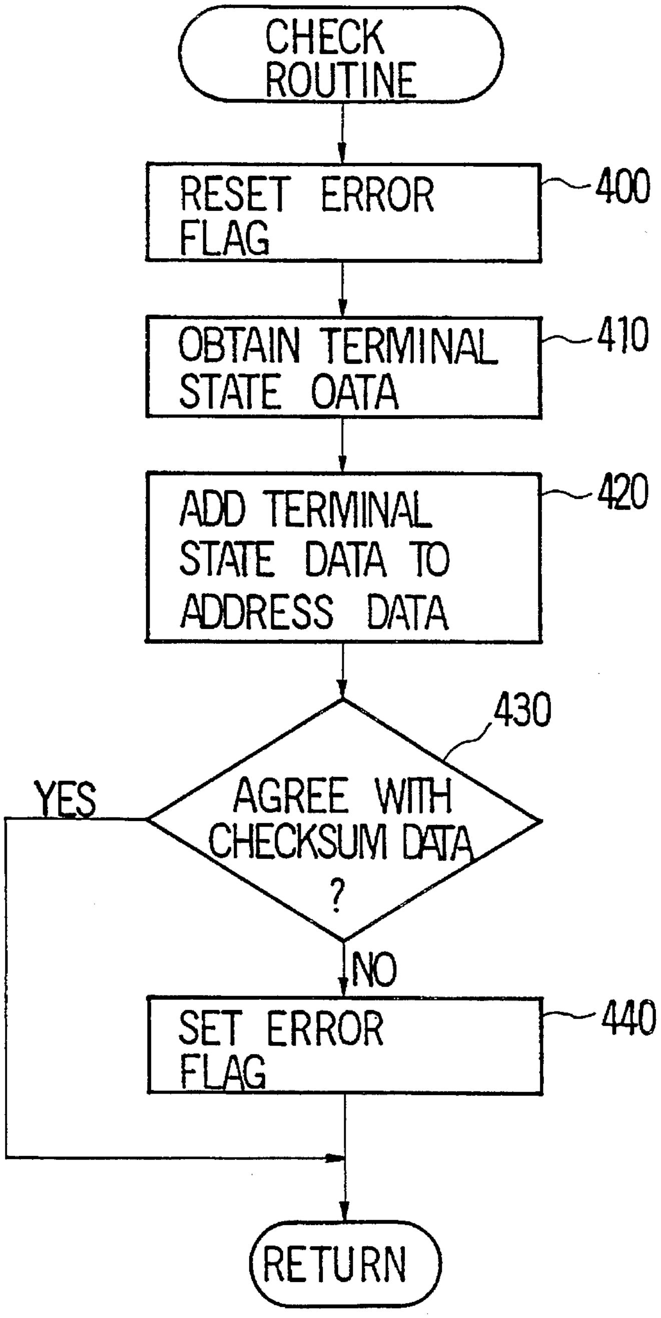
FIG. 5 is a flowchart which illustrates the error checking operation of the receiver of the embodiment.

The error checking is performed according to the operation shown in FIG. 5. In FIG. 5, in step 400, a response data error flag contained in the central control section 2 is reset. Thereafter, in step 410, the terminal state data of the response data is input to a computing unit. Next, in step 420, the address data of the address counter is added to the terminal state data. in step 430, a check is made to determine whether the data determined by the addition matches the checksum data in the response data. When a match is found, it is determined that there is no error in the response data. In contrast, when no match is found, it is determined that an error has occurred, and the response data error flag is set in step 440. Accordingly, only when an error is detected, the error flag is set.

To be specific, when the terminal state data is "00000001" and the address data is "00000010", the checksum data becomes "00000011". The response data is two bytes long, which is "00000001"+"00000011". When the two-byte response data is received by the receiver 1, the receiver 1 adds the received terminal state data "00000001" to the called address data "00000010", the result of the addition computation being "00000011". The error checking of the response data can be performed without degrading the transmission efficiency by comparing the computed "00000011" with the checksum data "00000011" of the terminal state data.

When the response data check routine is terminated, the process proceeds to step 230 in FIG. 3, where a check is made to determine whether the response data error flag has been set. If the error flag has not been set, the process proceeds successively to step 120 in FIG. 2. In contrast, if the error flag has been set, the rerun operation of step 240 is performed and thereafter the process proceeds to step 120.

Figure 6:
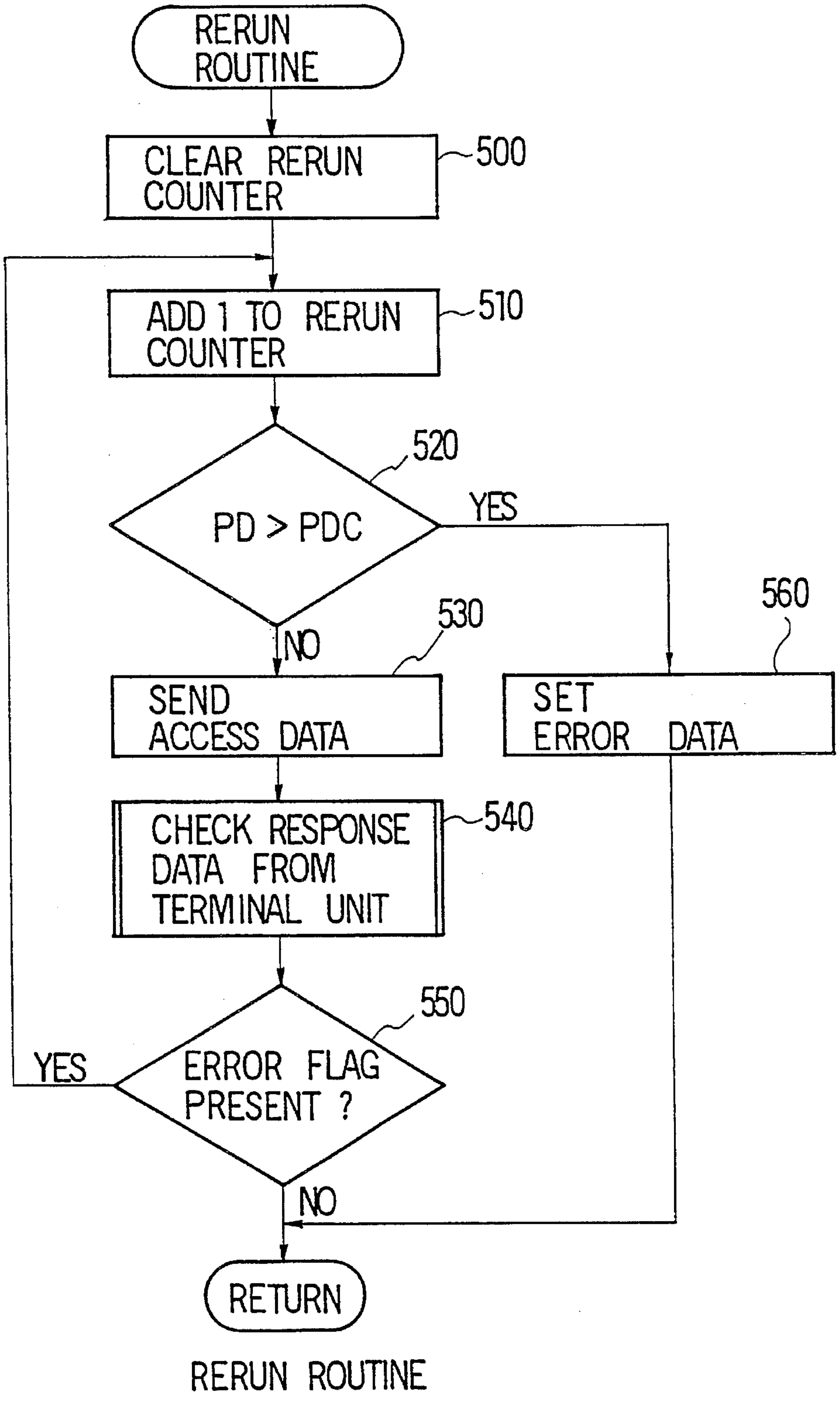
FIG. 6 is a flowchart which illustrates the rerun operation of the receiver of the embodiment.

The process of step 240 is performed according to the rerun routine shown in FIG. 6.

In step 500 in FIG. 6, a rerun counter in the central control section 2 is cleared. Next, in step 510, the data of the rerun counter is incremented by 1. In step 520, a check is made to determine whether a data value PD of the rerun counter has exceeded the predetermined number PDC of reruns. When the data value PD of the rerun counter has not exceeded the predetermined number PDC of reruns, the process proceeds to step 530 where the access data containing the same address data is sent out again to the terminal units over the transmission line L2. Response data from the terminal unit which has responded to the access data is received in step 540.

In step 540, the same operation as the check routine shown in FIG. 5 is performed. Accordingly, if the error flag is not set in step 440 in FIG. 5, the response data is normal; if the error flag is set, an error has been detected again in the response data.

Next, in step 550, a check is made to determine whether the error flag has been set. If the error flag has been set again, the rerun operation starting at step 510 is repeated until the set error flag is not detected in step 550. However, if it is determined in step 520 that the transmission error has not been eliminated even after the rerun operation has been repeated the predetermined number of times pdc, the process proceeds to step 560 where display data indicating that a transmission error has occurred is set, and the process returns to the polling operation in step 110 of FIG. 2.

Figure 2:
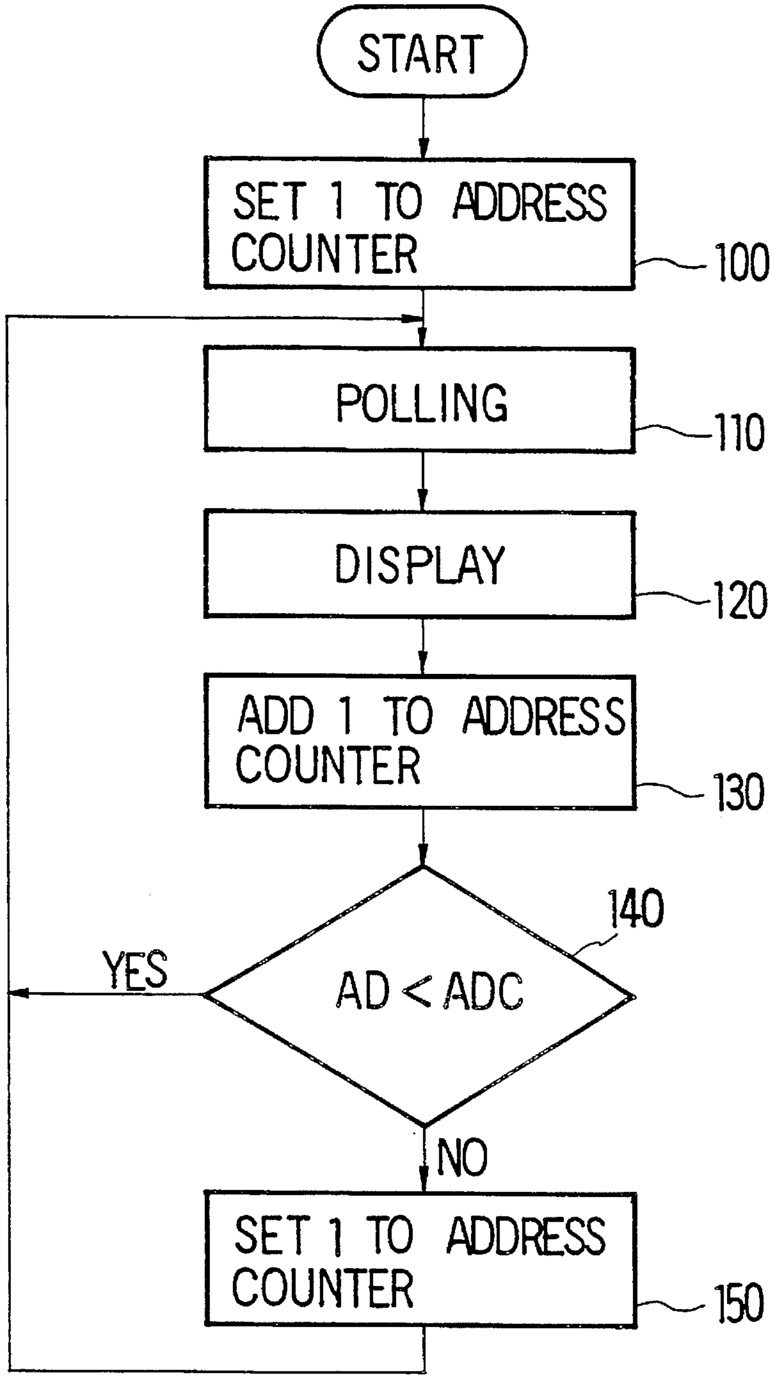
FIG. 2 is a flowchart which illustrates the operation of a receiver of the embodiment.

When the polling operation for one terminal unit is completed in step 110 of FIG. 2 in the above-described manner, the monitored state of the monitor area corresponding to the response data from the terminal unit, as well as the transmission error if such error has occurred, is displayed on the display section 3.

Next, in step 130, the data of the address counter is incremented by 1 in order to specify the next terminal unit. In step 140, a check is made to determine whether the data value ad of the address counter has exceeded the end address adc of the terminal unit. When the data value ad of the address counter has not exceeded the end address adc, the polling operation for the next terminal unit is performed by repeating again operations starting at step 110. In contrast, when it is determined in step 140 that the data value ad of the address counter has exceeded the end address adc of the terminal unit, the content of the address counter is reset to 1 in step 150. Thereafter, the polling operation beginning with the first terminal unit is performed by repeating again the operations starting at step 110.

According to this embodiment, as described above, the response data sent back from terminal units is formed of terminal state data and checksum data produced by adding the terminal state data to the self-address data. The receiver adds the address data to the terminal state data. When the data determined from this addition does not match the checksum data, it is determined that a transmission error has occurred. Therefore, it can be reliably detected in which terminal unit a transmission error has occurred. Since the data length of the response data is short even if the self-address data is contained in the response data, a high-speed polling operation is made possible.

Figure 9:
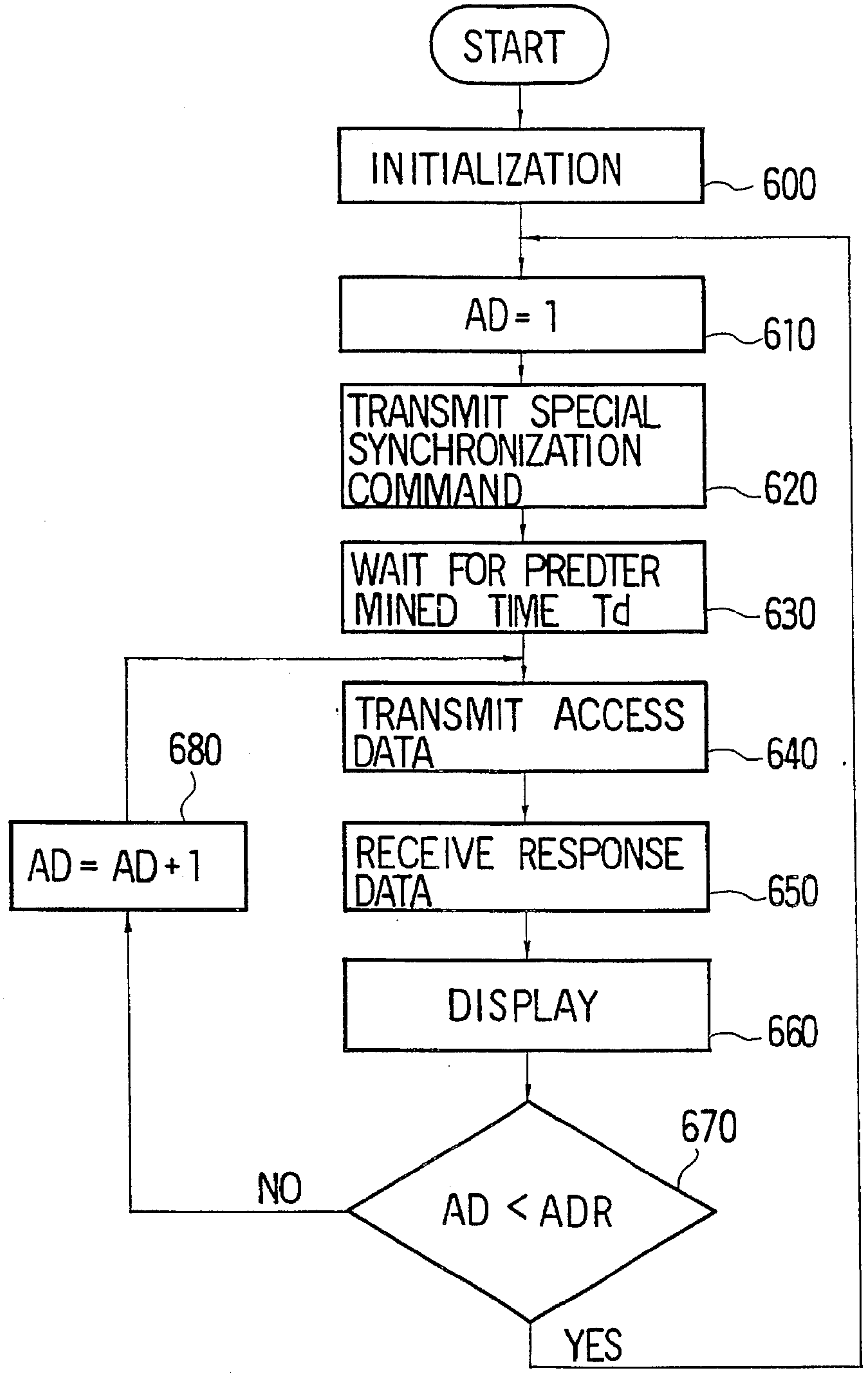
FIG. 9 is a flowchart which illustrates the polling operation of the receiver.

The transmission data synchronization operation according to this embodiment will now be explained with reference to the flowcharts shown in FIGS. 9 and 10. FIG. 9 shows the operation of the receiver 1, and FIG. 10 shows the operation of a terminal unit.

When the receiver 1 is powered on, a predetermined initialization operation for initiating a polling operation is performed in step 600. Next, in step 610, the central control section 2 of the receiver 1 sets the address of a terminal unit to be specified first in the address counter (not shown).

Next, in step 620, special synchronization command data formed of predetermined data codes is sent out before polling to the first terminal unit is performed.

Next, in step 630, data transmission is stopped for a time Td equal to a response time period. The time Td is set by the timer means 71, as described above. Thereafter, in step 640, the access data containing the first address data set in the address counter is sent out to the terminal unit over the transmission line L1.

Each of the terminal units perform the operation shown in FIG. 10 in response to the sending-out of the access data. When each terminal unit confirms that the data is special synchronization data in step 700, an operation for detecting the first start bit appended in the beginning of the command data in the access data is performed in step 710. In step 710, the start bit is detected by repeating a strobe operation at high speed on data transferred over the transmission line L1.

When the start bit is detected, the process proceeds to step 720 where the command data and the checksum data are analized and it is determined whether the address data has specified the self-address.

Only the terminal unit specified in the access data performs the operation of step 730. The terminal unit sends back the response data containing the terminal state data indicating the state of the monitor area, detected by the sensor section 8, and the address data indicating the self-address, to the receiver 1 over the transmission line L2. In contrast, in the rest of the terminal units which have not been specified, the process proceeds to step 740 where receiving of data through the transmission line L1 is stopped for a time Td during the response time period.

Referring back to FIG. 9, the receiver 1 receives response data in step 650 and analyzes the terminal state data. The result of the analysis is displayed on the display section 3 in step 660. The operation period of step 650 corresponds to the response time period.

Next, in step 670, a check is made to determine whether the data value ad set in the address counter has exceeded the end address adR of the terminal unit disposed in the disaster prevention monitoring system. When the end address has not yet been reached, the data of the address counter is incremented by 1 in step 680. Thereafter, operations starting at step 640 are performed again. The polling operation up to the terminal unit of the end address is sequentially performed by repeating the operations similar to those described above.

When the polling operation for the terminal unit of the end address is completed, the operation, beginning at step 610, is started again, and the polling operation starting with the first terminal unit is sequentially repeated.

According to this embodiment, as described above, the rest of the terminal units inhibits by itself the receiving of data through the transmission line L1 while the terminal unit corresponding to the access data from the receiver is sending back the response data. As a result, the terminal units are not affected by noise or the like which occurs in the transmission lines. Since the termination time of the inhibition time period is synchronized with the start time other access data is sent out, the next access data can be received. That is, since there is no data to be received through the transmission line L1 during the response time period, the terminal units are not affected by noise or the like by forcibly stopping unwanted receiving operation during the time period. Thus, malfunctions of the terminal units can be prevented.

Although in this embodiment the detection of the stop bit and interruption are performed by using the stop-bit detection circuit 10, a section for performing the above operations may be provided in the slave transmitter control section 7.

Many different embodiments of the present invention may be constructed without departing from the spirit and scope of the present invention. it should be understood that the present invention is not limited to the specific embodiments described in this specification. To the contrary, the present invention is intended to cover various modifications and equivalent arrangements included with the spirit and scope of the claims. The following claims are to be accorded a broad interpretation, so as to encompass all such modifications and equivalent structures and functions.

What is claimed is:

1. A transmission error detection method in a disaster prevention monitoring system, for detecting errors in data transmission between a receiver and terminal units, comprising the steps of:

connecting a plurality of terminal units having specific address data to first and second transmission lines led out from a receiver;

sending out access data including said address in the form of a voltage from said receiver through said first transmission line;

sending back response data by a terminal unit specified in the access data in the form of an electric current through said second transmission line during a response time period;

said response data sent back by the terminal unit which has responded to the access data sent out by said receiver being formed of terminal state data and checksum data produced by adding the terminal state data to said specific address data;

said terminal units, whose address are in accordance with the address specified in the access data when said receiver carries out accessing by specifying the address of said terminal units, transfer said response data during said response time period, and the terminal units, whose address are not in accordance with the address specified in the access data, inhibit receiving the response data through said first transmission line during said response time period;

adding address data specified by the receiver at a time of accessing to the terminal state data sent back during said response time period by said receiver; and determining that a transmission error has occurred when said addition does not match said checksum data, a transmission error being checked for correctness by comparing checksum data with data formed by adding the terminal state data to said specific address data at a receiver, and whether a response is present with state information transmitted from a specified address.

2. A disaster prevention monitoring system comprising:

means for connecting a plurality of terminal units having specific address to first and second transmission lines led out from a receiver;

means for sending out access data including said address in the form of a voltage from said receiver through said first transmission line;

means for sending back response data by a terminal unit specified in the access data in the form of an electric current through said transmission line during a response time period;

said terminal units comprising:

a serial data receiving circuit for receiving access data transferred from said first transmission line;

a stop-bit detection circuit with stop bits for establishing synchronization with the access data obtained via said serial data receiving circuit;

a slave transmitter control section containing a microprocessor having a checksum producing section for making checksum data by adding a specific address to terminal state data when a specific address, included in the access data obtained via said serial data receiving circuit matches the specific address of said terminal units, and for outputting a response data comprising the terminal state data and checksum data made at said checksum producing section;

a serial data transmission circuit for sending back response data from said slave transmission control section through said second transmission line in the form of electric-current data; and said receiver having a central control section for carrying out a calculation of adding the terminal state data in the response data sent from said terminal units to an accessed specific address, and for determining whether the calculation matches the checksum data of the response data, indicating a transmission error, and for checking a transmission error for correctness by comparing checksum data with data formed by adding the terminal state data to said specific address data at a receiver, and whether a response is present with state information transmitted from a specified address.

3. A disaster prevention monitoring system according to claim 2, wherein said terminal units comprise:

a control section for determining whether a terminal unit is specified in the access data and sending out the response data to the receiver when it has been specified;

a stop-bit detection circuit for detecting a stop bit appended after the checksum data in the access data and causing an interruption to the control section when the stop bit is detected; and timer means, disposed in the control section, for controlling the a period of the interruption by the stop-bit detection circuit.

* * * * *